United States Patent
Walton et al.

(10) Patent No.: US 7,798,527 B2
(45) Date of Patent: Sep. 21, 2010

(54) OVER-THE SHOULDER PORTABLE SEATBELT

(75) Inventors: Clint Walton, Malborough, MA (US); Ronald Leung, Quincy, MA (US); Sundar Krishnamurty, Amherst, MA (US); Anne M. Schewe, Amherst, MA (US); Joshua Doolittle, Westford, MA (US)

(73) Assignees: Sara's Wish Foundation, Amherst, MA (US); University of Massachusetts, Boston, MA (US)

( * ) Notice: Subject to any disclaimer, the term of this patent is extended or adjusted under 35 U.S.C. 154(b) by 214 days.

(21) Appl. No.: 12/098,170

(22) Filed: Apr. 4, 2008

(65) Prior Publication Data

US 2008/0246265 A1 Oct. 9, 2008

Related U.S. Application Data

(60) Provisional application No. 60/910,103, filed on Apr. 4, 2007.

(51) Int. Cl.
*B60R 22/10* (2006.01)
(52) U.S. Cl. .................................... 280/801.1; 280/808
(58) Field of Classification Search ................. 297/468, 297/485, 484, 250.1, 254, 255, 219.12, 475; 280/801.1, 808
See application file for complete search history.

(56) References Cited

U.S. PATENT DOCUMENTS

| | | | | |
|---|---|---|---|---|
| 4,637,629 A * | 1/1987 | Cummings | ............... | 280/801.1 |
| 5,499,860 A * | 3/1996 | Smith et al. | ................. | 297/255 |
| 5,624,135 A * | 4/1997 | Symonds | ................. | 280/801.1 |
| 5,733,014 A | 3/1998 | Murray | ....................... | 297/485 |
| 6,390,345 B1 * | 5/2002 | Brown et al. | ................. | 224/578 |
| D467,085 S * | 12/2002 | Kamiki | ........................ | D6/333 |
| 6,616,242 B1 * | 9/2003 | Stoll | .......................... | 297/485 |
| 6,631,959 B1 | 10/2003 | Amondo et al. | ............. | 297/485 |
| 6,932,429 B2 * | 8/2005 | Kamiki | ....................... | 297/255 |
| 7,140,692 B2 * | 11/2006 | Stoll | .......................... | 297/485 |
| 7,374,241 B2 * | 5/2008 | Gold et al. | .................. | 297/255 |
| 2002/0167214 A1 * | 11/2002 | Nelson et al. | ............... | 297/485 |
| 2007/0001495 A1 * | 1/2007 | Boyle et al. | ................. | 297/253 |

* cited by examiner

*Primary Examiner*—Ruth Ilan
(74) *Attorney, Agent, or Firm*—O'Shea Getz P.C.

(57) ABSTRACT

A portable seatbelt device for attachment to a seat to restrain a person to the seat includes a carrying case and a lap belt having a portion attached to the carrying case. The lap belt is operable to wrap around the person in the vicinity of the person's waist to thereby restrain the person to the device. An exit belt is included having a first portion, a length of which is attached to the carrying case, and a second portion extending from the carrying case with a buckle connector attached thereto. At least one retractable mechanism is attached to the first portion of the exit belt and contains at least one retractable belt. The retractable belt is operable to extend out from the retractable mechanism and around a portion of the seat and connect with the connector attached to the second portion of the exit belt to thereby wrap around the person in the vicinity of the person's shoulders to restrain the person to the seat.

11 Claims, 7 Drawing Sheets

OVER-THE SHOULDER PORTABLE SEATBELT

PRIORITY INFORMATION

This patent application claims priority from U.S. provisional patent application Ser. No. 60/910,103 filed Apr. 4, 2007, which application is hereby incorporated by reference.

BACKGROUND INFORMATION

This invention relates in general to vehicle passenger restraint systems, and in particular to a portable seatbelt device for use in vehicles such as buses and the like.

Buses and other similar vehicles generally are not equipped with seatbelts. This makes it dangerous for passengers in the bus (e.g., school children) by exposing them to possible injuries from being thrown about due to sudden movements of the bus and/or when the bus is involved in an accident.

What is needed is a portable, inexpensive, durable, compact, light-weight, seatbelt device integrated into a carrying case for use on buses or the like, which is easy for the user to connect and disconnect to various types of vehicle seats, to safely and securely restrain a person to the seat during movements of the vehicle that would otherwise cause the person to be displaced from the seat in the absence of the portable seatbelt device.

SUMMARY OF THE INVENTION

Briefly, according to an aspect of the present invention, a portable seatbelt device for attachment to a seat to safely restrain a person to the seat includes a carrying case and a lap belt having a portion attached to the carrying case. The lap belt is operable to wrap around the person in the vicinity of the person's waist to thereby restrain the person to the portable seatbelt. An exit belt is included having a first portion, a length of which is attached to the carrying case, and a second portion extending from the carrying case with a buckle connector attached thereto. At least one retractable mechanism is attached to the first portion of the exit belt and contains at least one retractable belt. The retractable belt is operable to extend out from the retractable mechanism and around a portion of the seat and connect to the second portion of the exit belt to thereby wrap around the person in the vicinity of the person's shoulders to restrain the person to the seat.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
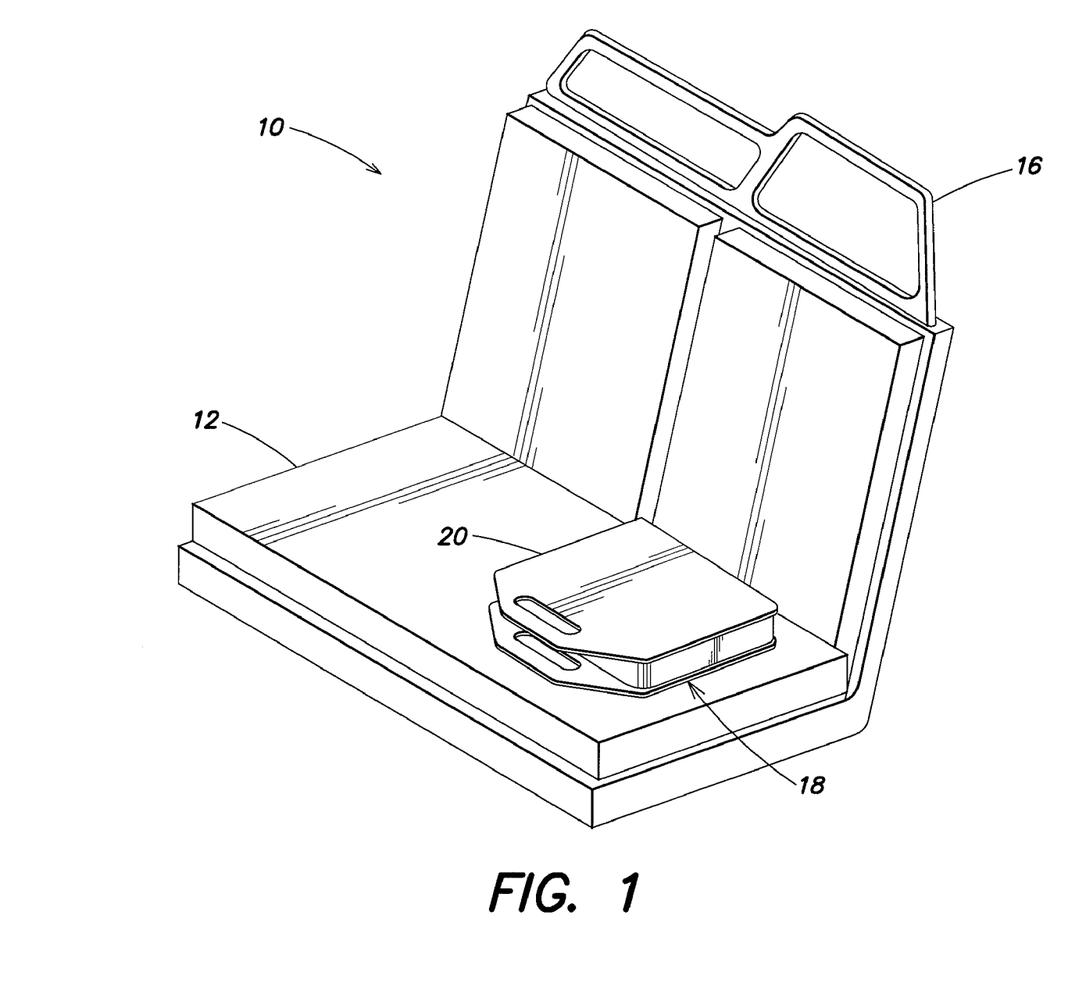
FIG. 1 is a top perspective view of the portable seatbelt system in its case, unopened on a seat where it is to be used.

FIG. 1 illustrates is a seat 10 that is part of, for example, a bus or other vehicle typically having a plurality of such seats 10. The seat 10 has a generally horizontal portion or seat bench 12 that a person sits on and a generally vertical portion or seat back 14 that a person can rest his/her back on. The seat 10 is typically elevated off the floor, so that the person, when seated, rests his/her feet on the floor. The seat 10 illustrated in FIG. 1 also has an open frame portion 16 at the top of the seat back. However, this open frame construction is merely an example of a type of a bus or other vehicle seat that a portable seatbelt device 18 can be connected with for the secure restraint of a passenger to the seat 10. It is intended that the portable seatbelt device 18 be compatible with a large variety of vehicle seat designs. Also illustrated in FIG. 1 is a carrying case 20 that is part of the portable seatbelt device 18. The carrying case 20 stores the remaining contents of the portable seatbelt device 18, as described in detail hereinafter.

Figure 2:
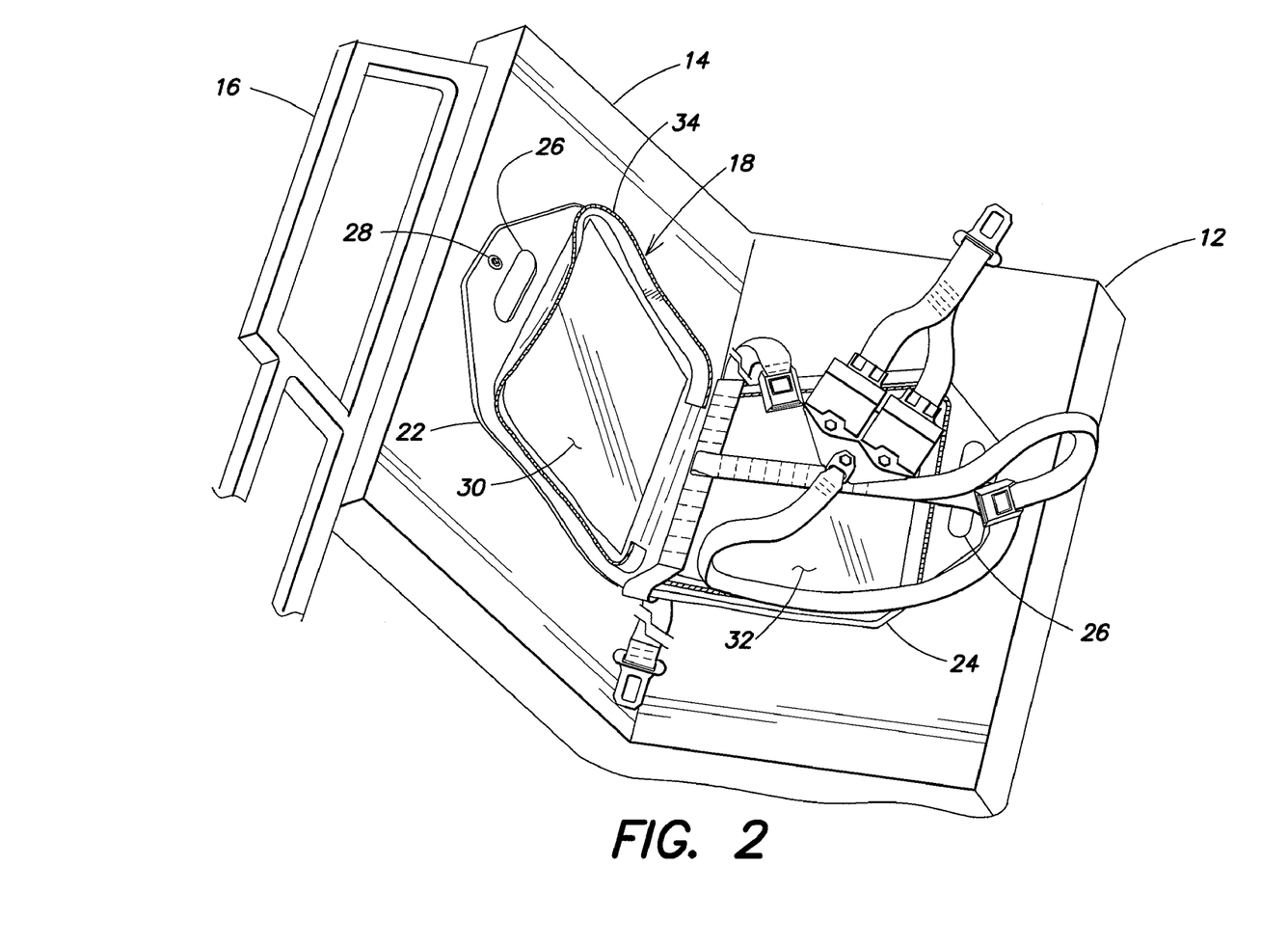
FIG. 2 is a top perspective view of the case opened illustrating its contents.

Referring to FIG. 2, the carrying case 20 is illustrated in an opened position on the seat 10, thereby exposing its inner construction and its contents. The carrying case 20 may be made from canvas or other suitable durable material, either flexible or non-flexible. The carrying case 20 may have a pair of opposing sides 22, 24 such that when the case 20 is closed, the two opposing sides 22, 24 fold over each other and connect together. A handle opening 26 may be formed in the top portion of each opposing side 22, 24 to facilitate carrying the case 20. The case 20 may also have a snap arrangement 28 for securing the top portions of the case 20 together. Preferably, each opposing side 22, 24 has a portion of its inner surface that comprises a semi-flexible panel 30, 32 of, for example, plastic or other suitable material. The panels 30, 32 define a pocket and infrastructure within the case 20, where the pocket stores the contents of the case 20 and can be securely closed by, for example, a zipper 34.

Referring also to FIG. 3, the case 20 is again illustrated in an opened position on the seat 10 and the contents of the case 20 are illustrated in the initial stages of being deployed to restrain a person in the seat 10. Included is a lap belt 36 that has a male buckle 38 attached at one end and a female buckle 40 attached at the opposite end. The male buckle 38 allows for some adjustment of the length of the lap belt 36 when positioned with respect to a user of the device 18. In a preferred embodiment, the lap belt 36 has a length of approximately sixty (60) inches.

Figure 3:
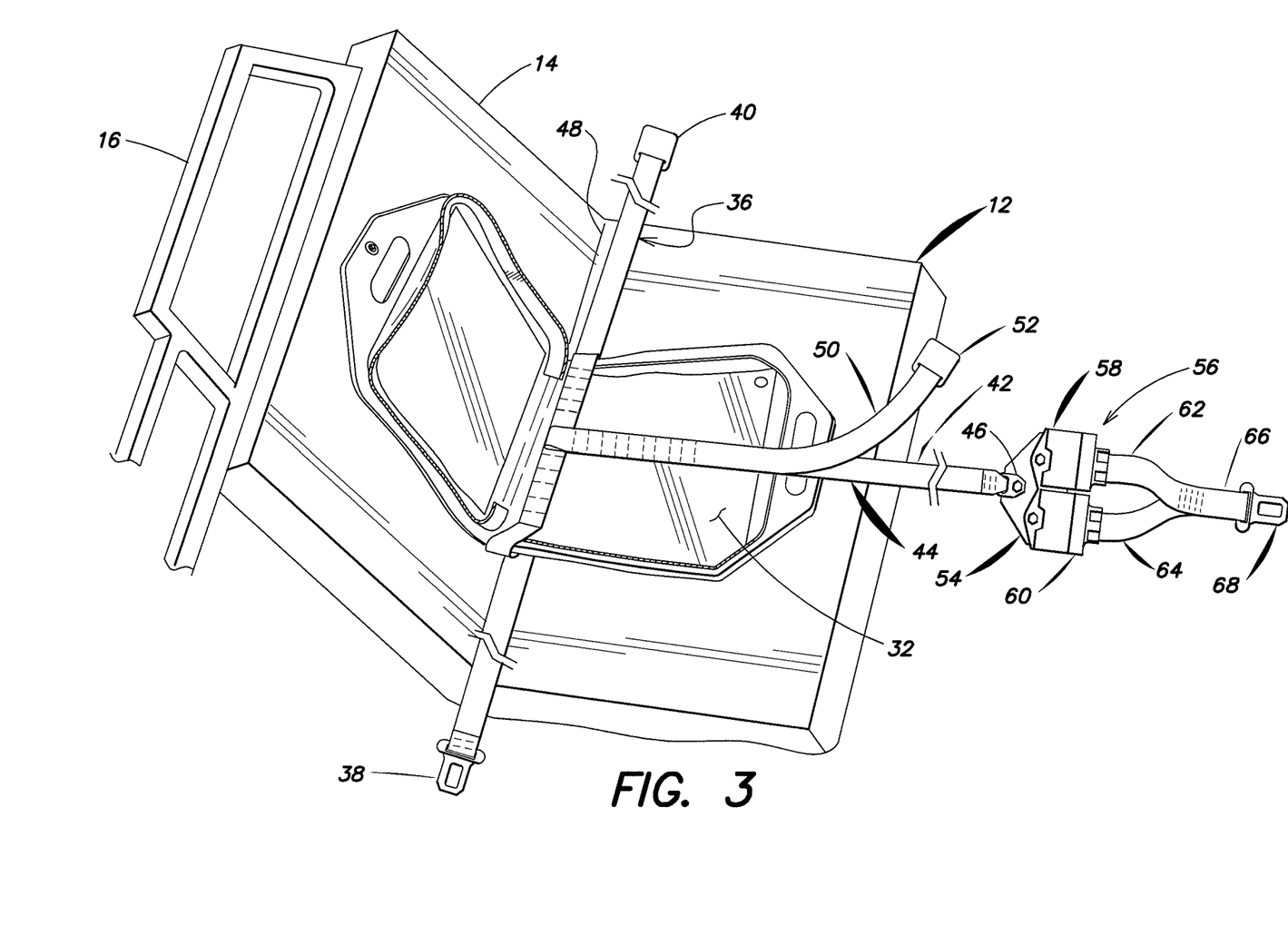
FIG. 3 is a top perspective view illustrating the case contents deployed.

The case 20 also includes an exit belt 42, which is disposed perpendicular to the lap belt 36. The exit belt 42 is folded over such that a lower portion 44 of the exit belt 42 has a length of approximately thirty two and one half (32.5) inches. Part of the lower portion 44 of the exit belt 42 is attached to the semi-flexible plastic panel infrastructure 32 of the case 20 preferably by sewing (or by some other suitable fastening technique) such that the lower portion 44 of the exit belt 42 is aligned at the midpoint as measured from either outer edge of the case 20. To the distal end of the lower portion 44 of the exit belt 42 is attached a steel belt connector loop 46. A middle portion of the lap belt 36 is also attached to the semi-flexible plastic panel infrastructure 32 of the case 20 by, for example, sewing. The lap belt 36 is oriented such that an edge of the belt 36 is aligned along the fold 48 of the case 20. The remaining upper portion 50 of the length of the exit belt 42 is folded over the lap belt 36 and is aligned directly on top of the lower portion 44 of the exit belt 42 which is sewn into the case 20. The upper portion 50 of the exit belt 42 is sewn along the lower portion 44 of the exit belt 42 for approximately nine inches. A female buckle 52 is attached to the end of the upper portion 50 of the exit belt 42.

Figure 6:
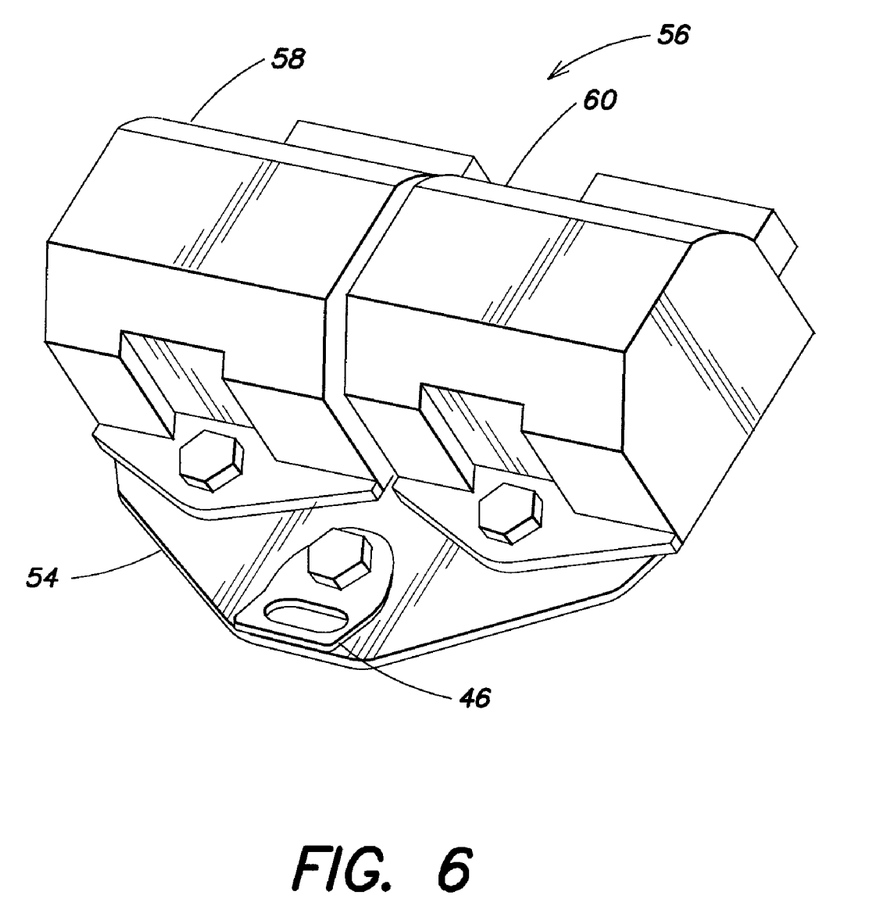
FIG. 6 is a perspective view of a retractor mechanism with an attached connector plate and connector.

The steel belt connector loop 46 attached to the end of the lower portion 44 of the exit belt 42 attaches by a nut and bolt arrangement to a plate 54 made of, for example, steel or other suitable material (e.g., composites or light-weight alloys), which is part of a retractable belt mechanism 56. This mechanism 56 is illustrated in greater detail in FIG. 6. Referring also to FIG. 6, the retractable belt mechanism 56 may include two separate commercially-available retractable seatbelts within their respective housings 58, 60. The lengths of the retractable belts are approximately seventy (70) inches. The housings 58, 60 may be bolted to the steel plate 54 or can be attached to the plate by other suitable techniques. As seen in FIG. 3, a portion of each belt 62, 64 is pulled out from its respective housing 58, 60 and the two ends are overlapped and attached by, for example, sewing to make a unitary belt end 66. Attached to this belt end 66 is a male buckle 68. The steel plate 54 can be manufactured to predetermined dimensions by conventional methods, including machining or stamping. All of the belts and buckles utilized in the portable seatbelt device 18 are preferably selected to meet federal seatbelt standards.

Figure 4:
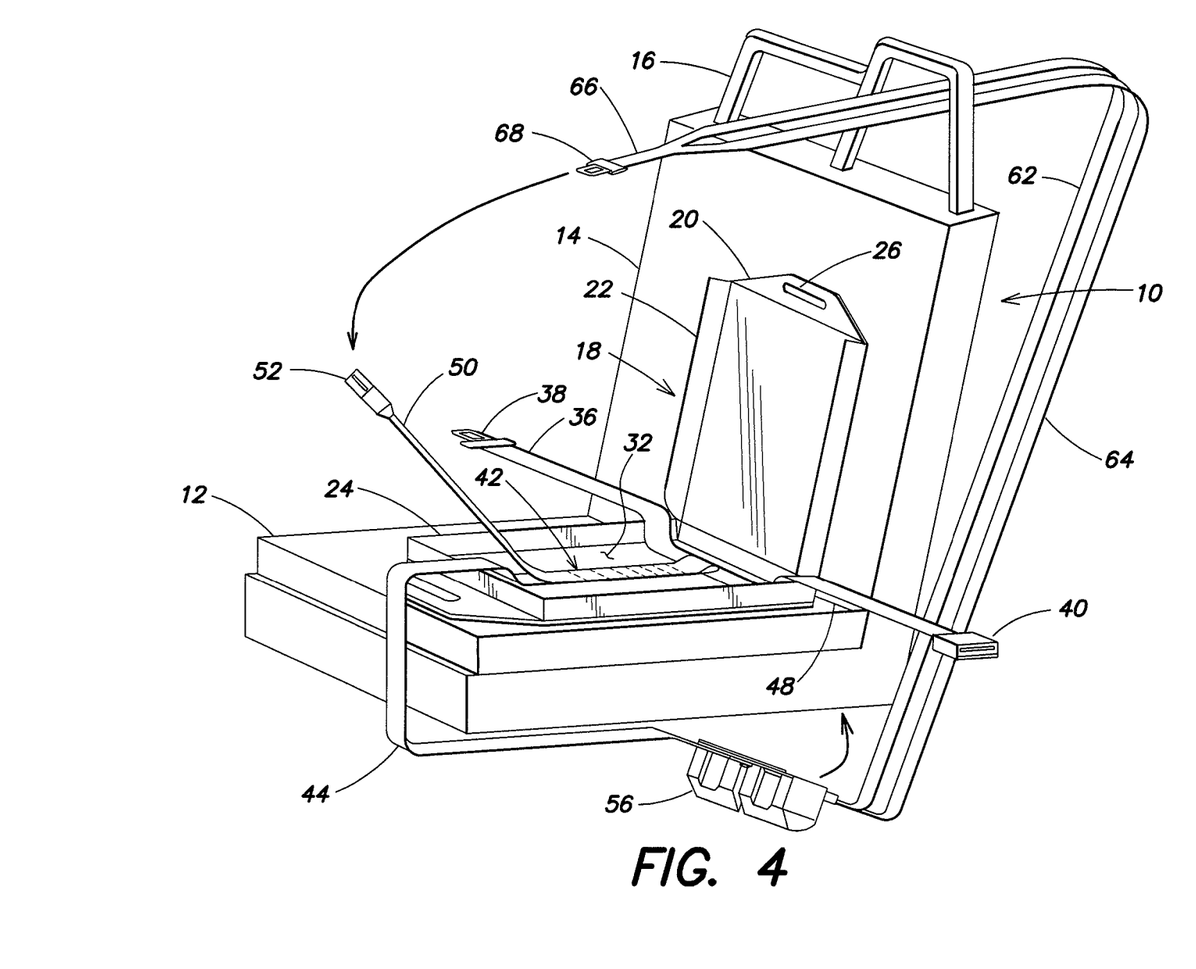
FIG. 4 is a schematic perspective view illustrating the portable seatbelt system operably positioned around a seat.

Referring to FIG. 4, the portable seatbelt device 18 is illustrated in the process of being installed with respect to the seat 10. For clarity and ease of illustration, a person that will be restrained in the seat 10 by the device 18 is not illustrated in FIG. 4. The user of the device 18 places the case 20 on the seat bench 12, with the handles 26 of the case 20 in a forward position. The lower opposing side 24 of the case 20 with the belts attached is disposed on the seat bench 12, while the upper opposing side 22 of the case 20 rests against the seat back 14. As such, the fold 48 of the case 20 (i.e., the point where the two opposing sides 22, 24 of the case 20 are joined) is located approximately where the back edge of the seat bench 12 meets the seat back 14. The case 20 is opened and the contents (e.g., the belts 36, 42 and the retractable mechanism 56) are removed, except for those portions of the lap belt 36 and the exit belt 42 that are attached to the semi-flexible plastic panel 32 infrastructure of the case 20.

Figure 5:
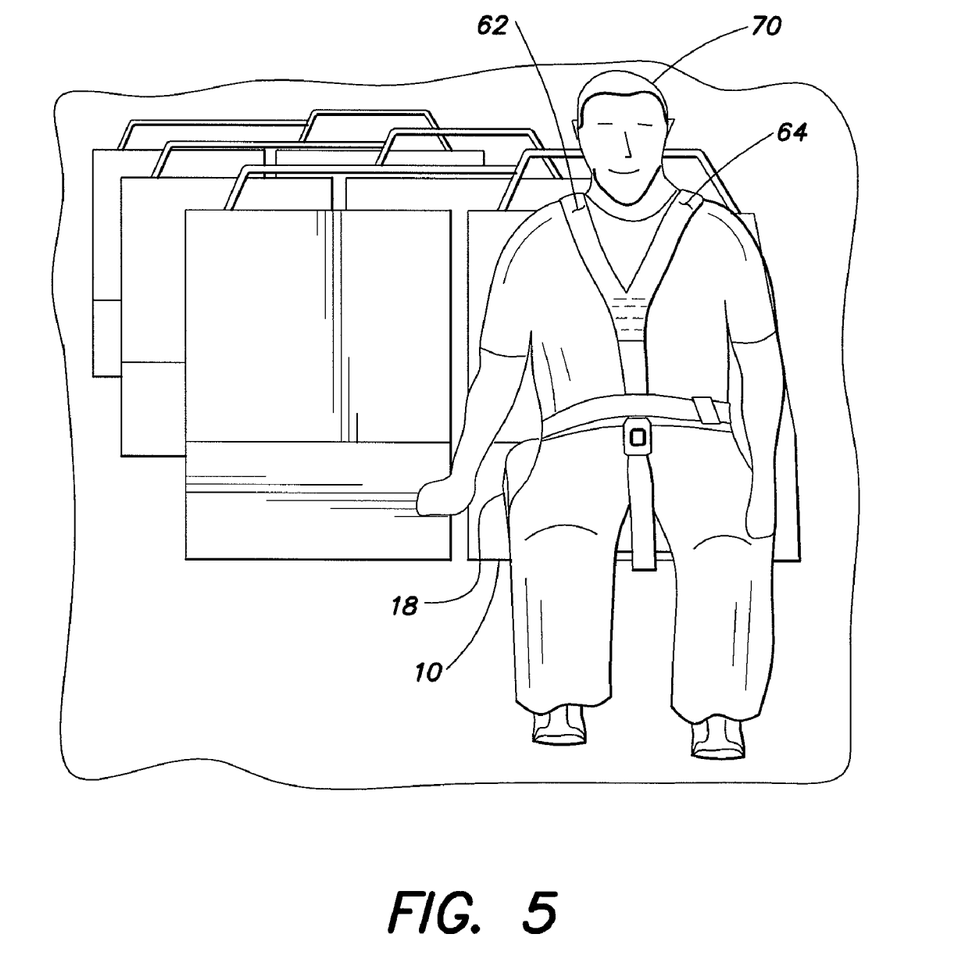
FIG. 5 is a perspective view of a person secured to the seat by the portable seatbelt system.

Next, although not shown in FIG. 4, the upper opposing side 22 of the case 20 is folded down over the lower opposing side 24 of the case 20, and the lap belt 36 and the exit belt 42 are positioned as shown. When folded closed, the case 20 forms a cushion that the user sits on. The retractable mechanism 56 is positioned such that the bottom of the steel plate 54 is disposed up against the surface of the underside of the seat bench 12. As such, the retractable mechanism 56 also functions to anchor or secure the remainder of the portable seatbelt device 18 to the seat 10. The case 20 is then held firmly in place on the seat bench 12, and the retractable belts 62, 64 are pulled around the back side of the seat back 14 and through the opening in the seat frame 16. The user then sits on the case 20 and on the seat bench 12 and buckles together the male buckle 68 at the end of the exit belt attached to the retractable belts 62, 64 and the female buckle 52 attached to the other end of the exit belt 42 disposed between the user's legs. This creates a V-structure of the belts 62, 64 over the user's torso. The user then buckles the lap belt 36 together and can adjust the length of the lap belt 36 and that of the exit belt 42 and the retractable belts 62, 64 for a snug fit. FIG. 5 illustrates a user 70 restrained to the seat 10 by the portable seatbelt device 18. It can be seen that the retractable belts 62, 64 are positioned over the shoulders of the user 70, while the lap belt 36 is positioned over the hips of the user 70.

Advantageously, the portable seatbelt device 18 is integrated with a carrying case 20. As such, the device 18 is lightweight and easy to connect and disconnect with respect to a seat 10. The carrying case 20 can be carried by itself or placed into a backpack as it has the basic dimensions of a folded carrying case. The device 18 does not encroach upon the space of a person sitting on either side of the user of the device 18.

Figure 7:
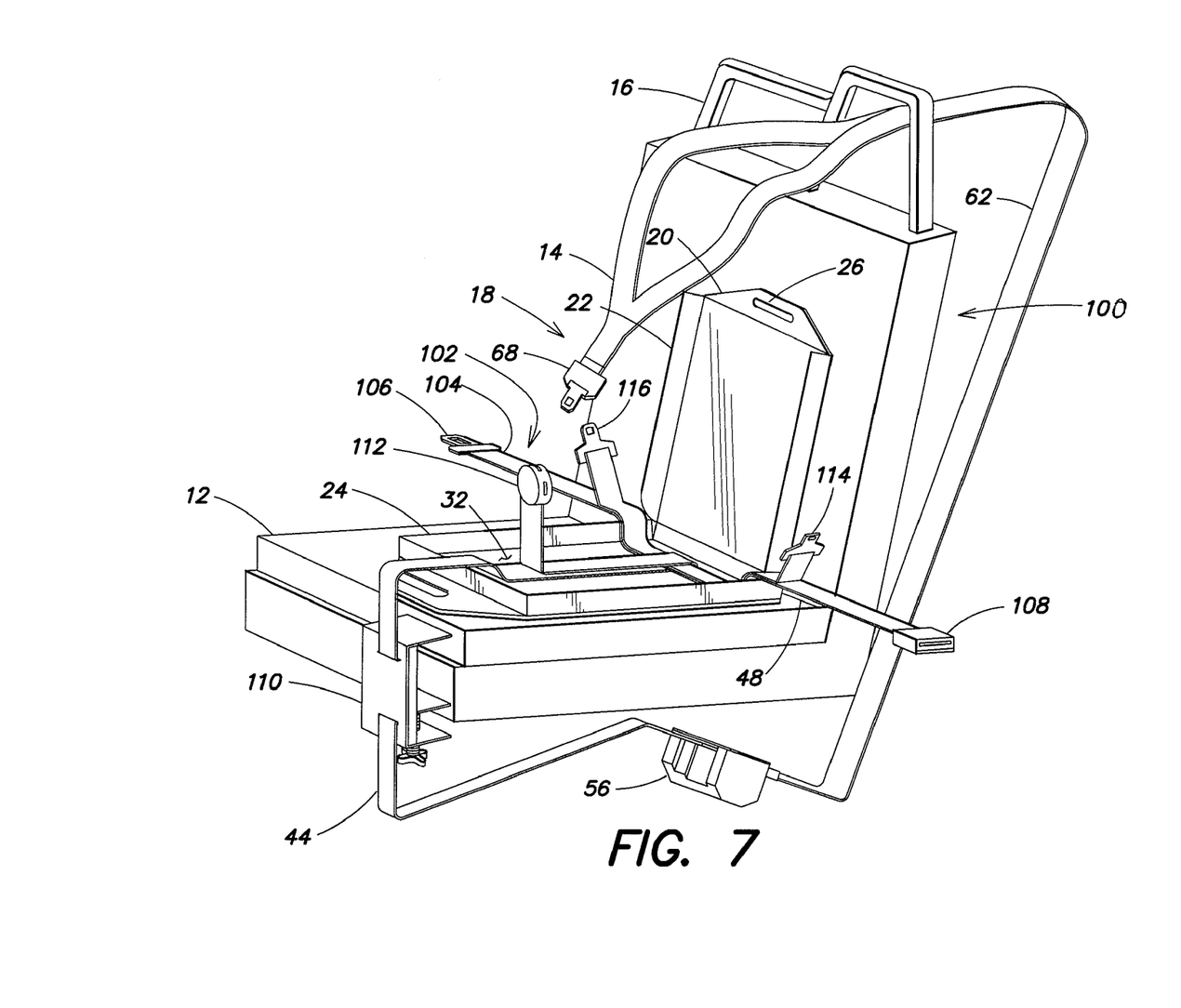
FIG. 7 is a perspective view of an alternative embodiment portable seatbelt system.

FIG. 7 illustrates an alternative embodiment portable seatbelt system 100. The system 100 is substantially similar to the embodiment illustrated in FIGS. 1-6, with a principal exception that it includes an under the seat belt 102, which includes a strap 104 and male and female buckles 106, 108, respectively that allow the under the seat belt 102 to be secured underneath the seat 12. Advantageously, this provides a further option for securing the seatbelt system 100 to the seat 12. An additional feature of this alternative embodiment is a clamp 110 for securing the seatbelt system 100 to the seat 12. The clamp 110 includes a screw 104 that allows the user to quickly secure/unsecure the clamp 110 to the seat. Yet another feature of this alternative embodiment seatbelt system 100 is a multi-clip 112 into which the shoulder and lap belts are secured. Specifically end male buckles 114, 116 of the lap belt and end male buckle 68 of the shoulder belt are each secured to the multi-clip. Advantageously, the multi-clip 112 also provides a single release point.

Although the embodiment of the portable seatbelt device 18 has been discussed in the context of dual retractable mechanisms, one of ordinary skill will recognize that a single retractable belt mechanism may be used. In addition, it is contemplated that the seatbelt device may not require the lap belt; that is, the exit belt that wraps around the user's shoulder may safely secure the passenger to the seat.

Although the present invention has been illustrated and described with respect to several preferred embodiments thereof, various changes, omissions and additions to the form and detail thereof, may be made therein, without departing from the spirit and scope of the invention.

What is claimed is:

1. A portable seatbelt device that attaches to a seat to restrain a person to the seat, the portable seatbelt device comprising:
   a carrying case;
   a lap belt having a portion attached to the carrying case;
   an exit belt having a first portion and a second portion, a length of the first portion being attached to the carrying case, the second portion having a connector attached thereto; and
   at least one retractable mechanism attached to the first portion of the exit belt and having at least one retractable belt, where when the device is in use the retractable belt is operable to extend out from the retractable mechanism and around a portion of the seat and connect with the connector attached to the second portion of the exit belt to thereby wrap around the person in the vicinity of the person's shoulder to thereby restrain the person to the seat.

2. The portable seatbelt device of claim 1, where the carrying case contains the lap belt, the exit belt and the retractable mechanism when the device is not in use.

3. The portable seatbelt device of claim 1, where the carrying case is disposed on the seat when the device is in use.

4. The portable seatbelt device of claim 1, where the lap belt further comprises a first connector attached to a first end of the lap belt and a second connector attached to a second end of the lap belt, where when the device is in use the first and second connectors are operable to be connected together to restrain movement of the person to the device.

5. The portable seatbelt device of claim 1, further comprising two retractable mechanisms each having a retractable belt, where the retractable belts are connected together at an end portion of each belt extending out from the corresponding retractable mechanism, where when the device is in use the connected end portion of each belt is operable to extend out from the two retractable mechanisms and around a portion of the seat and connect with the connector attached to the second portion of the exit belt to thereby wrap around the person in the vicinity of the person's shoulder to thereby restrain the person to the seat.

6. The portable seatbelt device of claim 1, where the carrying case comprises a flexible material.

7. The portable seatbelt device of claim 1, where the carrying case comprises a flexible material, and where the carrying case includes a second material attached to inside portions of the carrying case.

8. The portable seatbelt device of claim 7, where the second material comprises plastic.

9. The portable seatbelt device of claim 7, where the portion of the lap belt attached to the carrying case is sewn to the second material, and where the length of the first portion of the exit belt attached to the carrying case is sewn to the second material.

10. The portable seatbelt device of claim 1, where when the device is in use the retractable mechanism is disposed against a surface of the seat.

11. The portable seatbelt device of claim 1, where when the device is in use the retractable mechanism is disposed against an underside of the seat.

* * * * *